July 11, 1961
R. S. BASSETT
2,991,652
WATER METER SYSTEM
Filed April 21, 1959
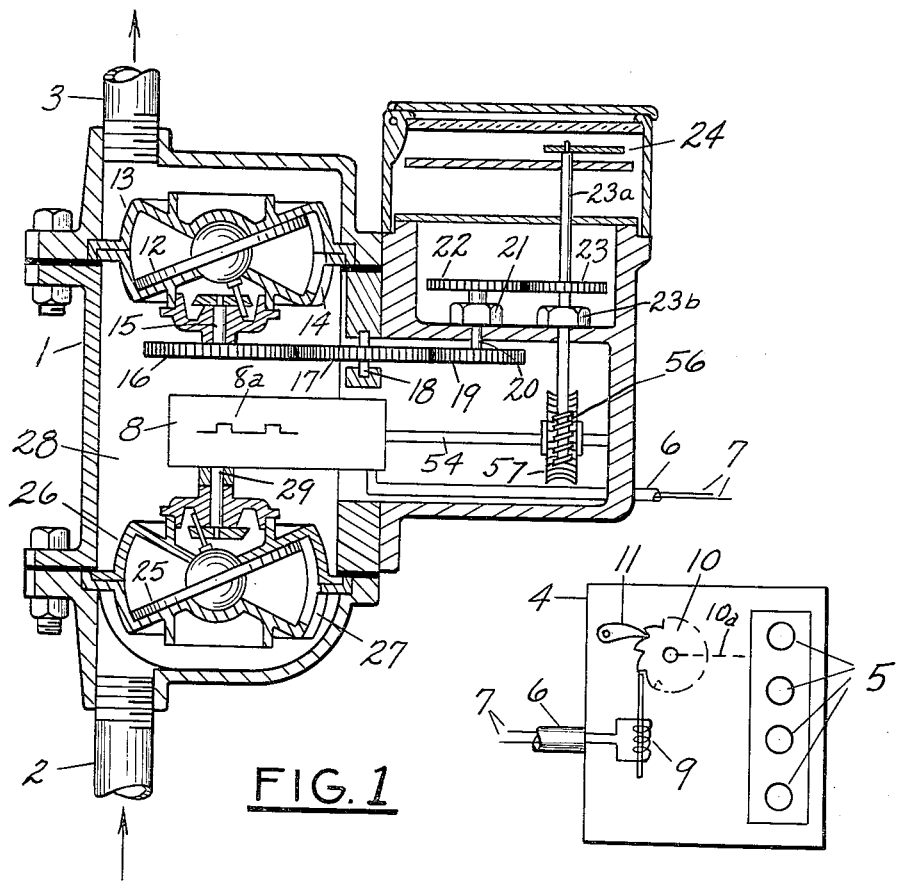
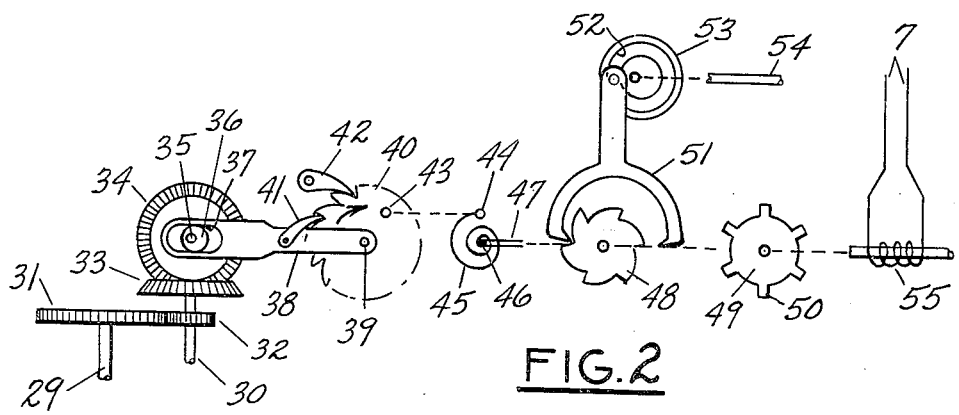
INVENTOR.
Robert S Bassett
BY
Ralph Hammar
Attorney … # 2,991,652
WATER METER SYSTEM
Robert S. Bassett, Buffalo, N.Y., assignor to American Meter Company, Incorporated, Philadelphia, Pa., a corporation of Delaware
Filed Apr. 21, 1959, Ser. No. 807,922
5 Claims. (Cl. 73—258)

In water meters, it is desirable that the meter be located within the building serviced so as to be protected from frost and that the meter register be located outside the building so as to be accessible to the meter reader. Because the meter register may be at a considerable distance from the meter, it has been difficult to provide a drive for the register which would not overload the meter.

This invention is intended to provide a remote register for a water meter which can be located a considerable distance from a meter and which does not overload the meter. This is accomplished by an auxiliary water driven motor preferably within the meter casing which powers an electrical impulse generator which actuates the meter register. The water measuring element has no direct connection with the register but merely trips or triggers the impulse generator. Each time the impulse generator is tripped, an impulse is fed to a ratchet device or escapement advancing the register a single step. Since all that the water meter or measuring element does is to actuate the trigger for the impulse generator, negligible load is imposed on the water meter and the accuracy is not affected.

In the accompanying drawing, FIG. 1 is a diagrammatic sectional view of a water meter installation and FIG. 2 is a diagrammatic view of the impulse generator for driving the meter register.

The water meter is enclosed within a casing 1 having an inlet 2 and an outlet 3 for connection in the incoming water service line. This meter can be located in an convenient location inside the building so as to be well protected from frost. On the outside of the building in a location convenient to a meter reader is a remote register 4 having the usual indicating dials 5. The remote register is connected to the meter casing by a conduit 6 housing conductors 7 leading from an impulse generator 8 to a solenoid 9. At suitable intervals, for example every 25 gallons, the impulse generator 8 feeds an electrical impulse such as diagrammatically indicated at 8a to the solenoid 9 which advances a ratchet 10 one tooth. A pawl 11 prevents reverse rotation of the ratchet. The ratchet 10 through a drive diagrammatically indicated by dotted line 10a drives the register 5. The meter casing, the register casing and the conduit are readily sealed to prevent tampering. The impulse generator 8 is located within the meter casing. All of the parts are accordingly under the control of the water company.

The measuring element is shown as a water meter having a nutating disc 12 mounted in a housing 13 in the upper part of the casing 1. The housing has an inlet 14 and delivers water to the outlet 3. The housing 13 is arranged so that all of the water entering the outlet 3 must flow through the measuring element. As the disc 12 nutates, it drives a shaft 15 fixed to a gear 16 which drives an idler gear 17 fixed to idler shaft 18 in turn driving a gear 19 fixed to a test register shaft 20. The shaft 20 projects through a stuffing box 21 and has fixed to its upper end a meter change gear 22 meshing with a register change gear 23 on a shaft 23a driving the test register pointer 24. The lower end of shaft 23a extends through stuffing box 23b. The gears 22, 23 may be easily changed for the purpose of calibrating the meter. The change gears are outside the meter housing 1 and accordingly are readily accessible, both for calibrating the meter and for testing it in service. There is no mechanical connection between the shaft 20 and the remote register 4.

In the lower part of the casing 1 is a hydraulic motor which can, for example, be a nutating disc water meter element having a nutating disc 25 in a housing 26 having a water inlet 27 and delivering water to the space 28 between the measuring element and the motor element. The housing 26 is arranged so that all of the water entering the inlet 2 must flow through the motor element in order to reach the space 28. The motor element has no connection with the measuring element. As the disc 25 of the motor element nutates, it drives a shaft 29 which drives the impulse generator 8.

The operation of the impulse generator is diagrammatically illustrated in FIG. 2. Rotation of the shaft 29 by the motor unit drives a shaft 30 in the impulse generator through gears 31 and 32. The shaft 30 has fixed thereto a bevel gear 33 driving a bevel gear 34 fixed to a shaft 35 keyed to an eccentric 36 fitting in a slot 37 in a lever 38 pivoted on a shaft 39. As the eccentric 36 is rotated, the lever 38 is oscillated up and down about its pivot 39 and drives a ratchet 40 fixed to the shaft 39, the drive being through a pawl 41 and moving the ratchet a distance of one tooth for each complete oscillation of the lever. A pawl 42 prevents backward rotation of the ratchet. On the ratchet is a pin 43 fixed to the outer end 44 of a coil spring 45. The coil spring is concentric with the shaft 39 but is moved to one side for clarity of illustration. The inner end 46 of the coil spring 44 is fixed to a shaft 47 in turn fixed to a ratchet 48 and an armature 49 having permanent magnet pole pieces 50. As the motor unit turns the shaft 29, the coil spring 45 is wound, increasing the tension. Rotation of the shaft 47 is controlled by an escapement 51 positioned by a cam track 52 in a cam member 53 driven by the shaft 54 associated with the measuring element. At each half revolution of the cam member 53, the escapement 51 is tilted to allow movement of the ratchet 48 through a distance equal to one tooth of the ratchet. This movement of the ratchet permits a corresponding movement of one of the permanent magnet pole pieces 50 of the armature 49 past a coil 55 and generates the voltage pulse 8a which appears in the conductors 7 and which causes a single step movement of the ratchet 10 of the register as described above.

The drive for the shaft 54 is through a worm 56 fixed to a shaft 23a and a worm gear 57 fixed on the shaft 54. The worm 56 is fixed to the shaft which drives the test register pointer 24 and accordingly the rotation of the shaft 54 accurately reflects the true measurement of flow after calibration which may involve changing the gears 22, 23. Calibration does not require change of the gears submerged in the casing 1.

In this arrangement, it will be noted that only a very slight load is imposed on the water meter measuring element 12, 13, 14 because this element merely has to trip the escapement 51. It should also be noted that the motor element 25, 26, 27 which supplies the power for the impulse generator 8 is not connected at all to the measuring element. The motor element can be of any desired design. Its only requirement is that it supply the power to drive the impulse generator 8.

It is not essential that the impulse generator be within the casing 1. It may be mounted in any convenient location since it is only necessary that the generator have a driving connection to the hydraulic motor and that its escapement or trip member 51 be connected to the measuring element.

It will be noted that the meter will register if connected backwards or with the direction of flow reversed.

Impulse generators are well known and in actual practice may differ considerably in appearance from the

What is claimed as new is:

1. In a water meter, a casing having an inlet and an outlet for connection in a water line serving a building and adapted for mounting inside the building, a nutating disc measuring element within the casing having an inlet port at an intermediate part of the casing between the casing inlet and outlet and arranged so that all water passing to the outlet must pass through the measuring element, a water motor in the casing between the inlet and said intermediate part of the casing and powered by the water flowing into the casing inlet, an electrical impulse generator having a spring drive wound by said motor, a meter change gear outside the casing driven by the measuring element, a register change gear outside the casing driven by the meter change gear, a test register pointer outside the casing, a shaft fixed to said pointer and said register change gear, a stuffing box in said casing through which said shaft extends into the casing, trip means within the casing actuated by said shaft for releasing the spring drive to deliver successive electrical impulses corresponding to the rotation of the test register pointer, a remote register housing for mounting outside the building in a location accessible to the meter reader, mechanism for advancing the remote register a step each time an electrical impulse is received, and wiring for transmitting impulses from said generator to said mechanism.

2. In a water meter, a casing having an inlet and an outlet for connection in a water line serving a building and adapted for mounting inside the building, a rotary flow responsive element within the casing for measuring the stream of water flowing to the outlet, a water motor driven by the water stream, an electrical impulse generator having a spring drive wound by said motor, a meter change gear outside the casing driven by the measuring element, a register change gear outside the casing driven by the meter change gear, a shaft driven by the register change gear, trip means driven by said shaft for releasing the spring drive to deliver an electrical impulse, a remote register housing for mounting outside the building in a location accessible to the meter reader, mechanism for advancing the remote register a step each time an electrical impulse is received, and wiring for transmitting impulses from said generator to said mechanism.

3. In a water meter, a casing having an inlet and an outlet for connection in a water line serving a building and adapted for mounting inside the building, a rotary flow responsive element within the casing for measuring the stream of water flowing to the outlet, a water motor driven by the water stream, an electrical impulse generator having a spring drive wound by said motor, trip means for releasing the spring drive to deliver an electrical impulse, a driving connection from the flow responsive element to the trip means for driving the trip means in proportion to the flow, a remote register housing for mounting outside the building in a location accessible to the meter reader, mechanism for advancing the remote register a step each time an electrical impulse is received, and wiring for transmitting impulses from said generator to said mechanism.

4. In a water meter, a casing having an inlet and an outlet for connection in a water line serving a building and adapted for mounting inside the building, a rotary flow responsive element within the casing for measuring the stream of water flowing to the outlet, a motor, an electrical impulse generator having a spring drive wound by said motor, trip means for releasing the spring drive to deliver an electrical impulse, a driving connection from the flow responsive element to the trip means for driving the trip means in proportion to the flow, a remote register housing for mounting outside the building in a location accessible to the meter reader, mechanism for advancing the remote register a step each time an electrical impulse is received, and wiring for transmitting impulses from said generator to said mechanism.

5. In a water meter, a casing having an inlet and an outlet for connection in a water line serving a building and adapted for mounting inside the building, a nutating disc measuring element within the casing having an inlet port at an intermediate part of the casing between the casing inlet and outlet and arranged so that all water passing to the outlet must pass through the measuring element, a water motor in the casing between the inlet and said intermediate part of the casing and powered by the water flowing into the casing inlet, an electrical impulse generator having a spring drive wound by said motor, trip means for releasing the spring drive to deliver an electrical impulse, a driving connection from the measuring element to the trip means, a remote register housing for mounting outside the building in a location accessible to the meter reader, mechanism for advancing the remote register a step each time an electrical impulse is received, and wiring for transmitting impulses from said generator to said mechanism.

References Cited in the file of this patent

UNITED STATES PATENTS

| | | |
|---|---|---|
| 2,060,674 | Hicks | Nov. 10, 1936 |
| 2,168,473 | Cutting | Aug. 8, 1939 |
| 2,273,718 | Morgan | Feb. 17, 1942 |